(12) United States Patent
McMaster

(10) Patent No.: US 8,800,581 B1
(45) Date of Patent: Aug. 12, 2014

(54) COMPACTABLE CAR COVER

(71) Applicant: Peter Michael McMaster, Endwell, NY (US)

(72) Inventor: Peter Michael McMaster, Endwell, NY (US)

( * ) Notice: Subject to any disclaimer, the term of this patent is extended or adjusted under 35 U.S.C. 154(b) by 48 days.

(21) Appl. No.: 13/752,087

(22) Filed: Jan. 28, 2013

(51) Int. Cl.
*E04H 15/06* (2006.01)
*B60J 11/00* (2006.01)

(52) U.S. Cl.
CPC ........................................ *B60J 11/00* (2013.01)
USPC ...................................................... 135/88.05

(58) Field of Classification Search
CPC .............. B60J 11/00; B60J 7/10; B60J 11/04; E04H 15/06; B63B 17/02
USPC .............. 135/88.01, 88.05, 88.07; 296/136.1, 296/136.11, 136.12
See application file for complete search history.

(56) References Cited

U.S. PATENT DOCUMENTS

| | | | | | |
|---|---|---|---|---|---|
| 2,496,085 | A | * | 1/1950 | Engelheart | 135/161 |
| 4,848,827 | A | * | 7/1989 | Ou | 296/99.1 |
| 5,197,503 | A | * | 3/1993 | Chen | 135/88.07 |
| 6,206,451 | B1 | * | 3/2001 | Maano | 296/136.04 |
| 6,935,674 | B1 | * | 8/2005 | Campos | 296/98 |
| 7,240,684 | B2 | * | 7/2007 | Yang | 135/88.07 |
| 2008/0022916 | A1 | * | 1/2008 | Borges et al. | 114/361 |
| 2009/0072578 | A1 | * | 3/2009 | Wang | 296/136.12 |
| 2013/0206050 | A1 | * | 8/2013 | Russikoff | 114/361 |

* cited by examiner

*Primary Examiner* — Noah Chandler Hawk

(57) ABSTRACT

A compactable car cover provides a flexible covering material that is attached to a car by a frame. The frame can be collapsed into a smaller state for storage by sliding telescoping rods into the central section of the frame. The frame is secured to a vehicle by large suction cups, which are placed on the windshield and rear window of a vehicle. The telescoping rods that form each side of the frame provide an attachment point for the covering material. Each pair of telescoping rods is connected by their own individual cover material, necessary for allowing the telescoping rods to be retracted into the center section. Unlike the outer telescoping rods, the front and rear rods that form the center section cannot be moved, instead serving as a support for the other rods and connection point for the mounting system.

20 Claims, 9 Drawing Sheets

US 8,800,581 B1

COMPACTABLE CAR COVER

FIELD OF THE INVENTION

The present invention relates generally to a vehicle cover which can easily be adjusted for storage or deployment.

BACKGROUND OF THE INVENTION

Since their infancy in the 19th century, automobiles have developed greatly and become a ubiquitous sight in the modern era. Millions of people own cars and trucks today, with recent data from the United States Department of Energy finding that there are 811.83 vehicles per 1000 people in the United States as of the year 2010. The same data shows that the average age of passenger cars has been increasing annually, from 8.4 years in 1995 to 11.1 years in 2011. As the average age of cars increases, so does the emphasis on maintenance of said cars. Well maintained cars will require less repair and depreciate less than their poorly maintained counterparts. One aspect of maintenance is protecting the paint and exterior surfaces of the vehicle. To protect their vehicle, many persons resort to using a vehicle cover.

Vehicle covers are sheets that are draped over a vehicle to protect against the elements, including sunlight, rust, and debris. Sometimes these sheets have elastic edges, which help to better secure the vehicle cover to the vehicle. However, due to variations in vehicle size, even elastic covers tend to be loosely fitted in spots, such as across the top roof or doors of a vehicle. This is a potential downside, as dirt often gets in the space between a vehicle cover and the vehicle itself. While the dirt is not an issue by itself, windy conditions can cause the vehicle cover to shift and move in various ways. A moving vehicle cover can cause the hidden dirt to scratch against the surface of the vehicle, damaging paint jobs that were expensive, are expensive to repair, or even both. For many people this is reason enough to forego the use of a vehicle cover; however, their vehicle is then left exposed to the elements. While some persons may be able to store their vehicle in a covered location such as a garage, not all vehicle owners are afforded that luxury. There is a need for a vehicle cover that can protect a vehicle while eliminating the potential for undesired side effects.

It is therefore an object of the present invention to provide a vehicle cover that protects a vehicle without touching the vehicle surface. It is a further object of the present invention to provide a vehicle cover that can be adjusted to a compact state for storage. It is a further object of the present invention to provide a vehicle cover that creates shade and protects against the elements.

DETAIL DESCRIPTIONS OF THE INVENTION

Figure 1:
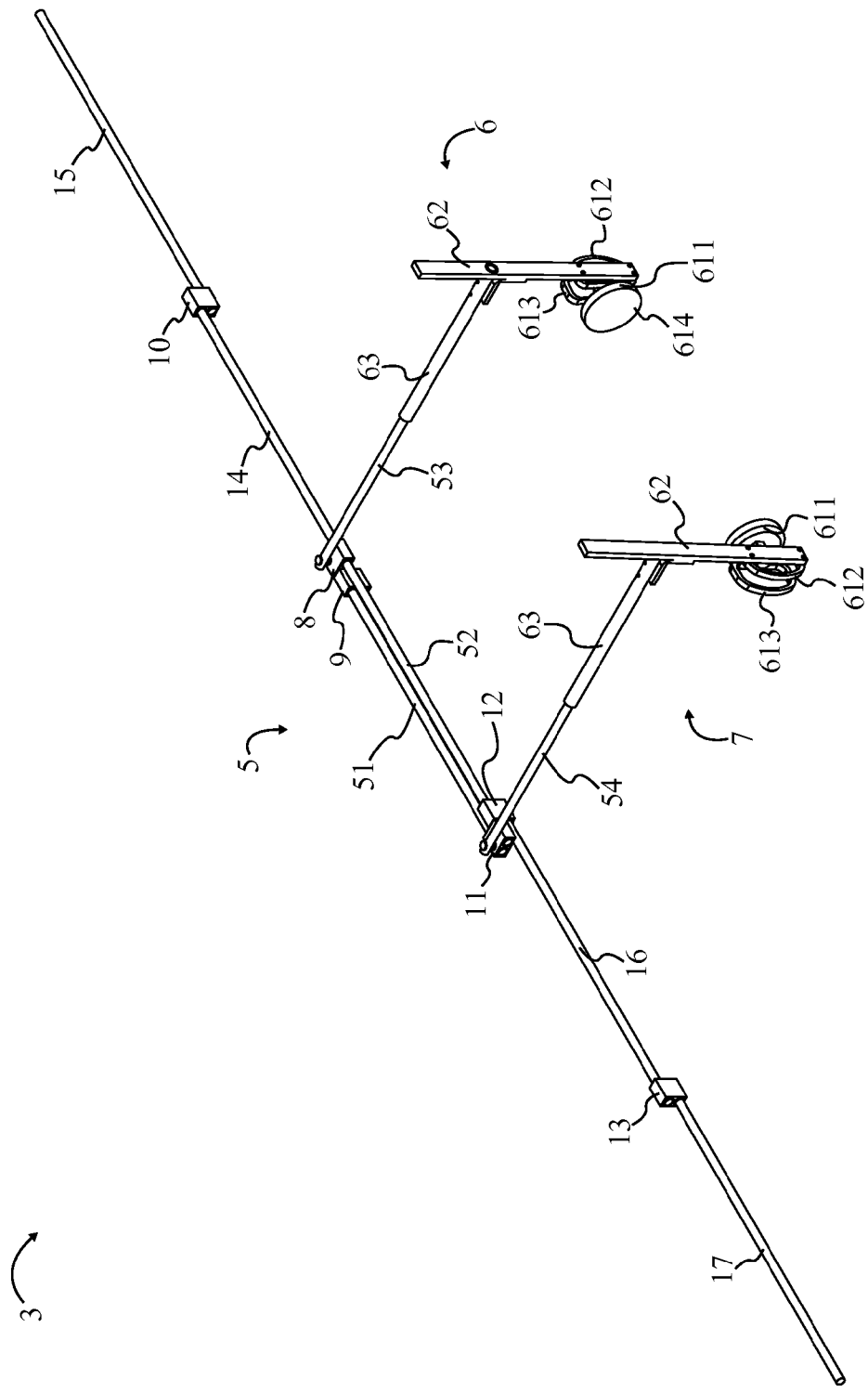
FIG. 1 is a perspective view of the fully extended left structure of the present invention.

All illustrations of the drawings are for the purpose of describing selected versions of the present invention and are not intended to limit the scope of the present invention.

The present invention is a compactable vehicle cover that forms a tent-like covering when in use and which is capable of being adjusted to a more compact storage configuration. The compactable vehicle cover comprises a frame structure 1 and a plurality of covers 2. The frame structure 1 attaches to the vehicle being covered and provides a support for the plurality of covers 2, which is connected atop the frame structure 1.

The frame structure 1 comprises a left structure 3 and a right structure 4, which are identical to each other. The left structure 3 and the right structure 4 each comprise a center section 5, a front mounting section 6, a rear mounting section 7, a front connector 8, a first front sliding connector 9, a second front sliding connector 10, a rear connector 11, a first rear sliding connector 12, a second rear sliding connector 13, a first front extension flex rod 14, a second front extension flex rod 15, a first rear extension flex rod 16, and a second rear extension flex rod 17, the arrangement of which can be seen in FIG. 1-FIG. 3. The center section 5 serves as an intermediate section between the extension rods and the mounting sections. The front mounting section 6 and the rear mounting section 7 serve to attach the center section 5 to a vehicle. The center section 5 supports the extension rods, which slide along the center section 5 to switch from a use configuration to a storage configuration. The left structure 3 and the right structure 4 are mounted to opposite sides of the vehicle.

Figure 2:
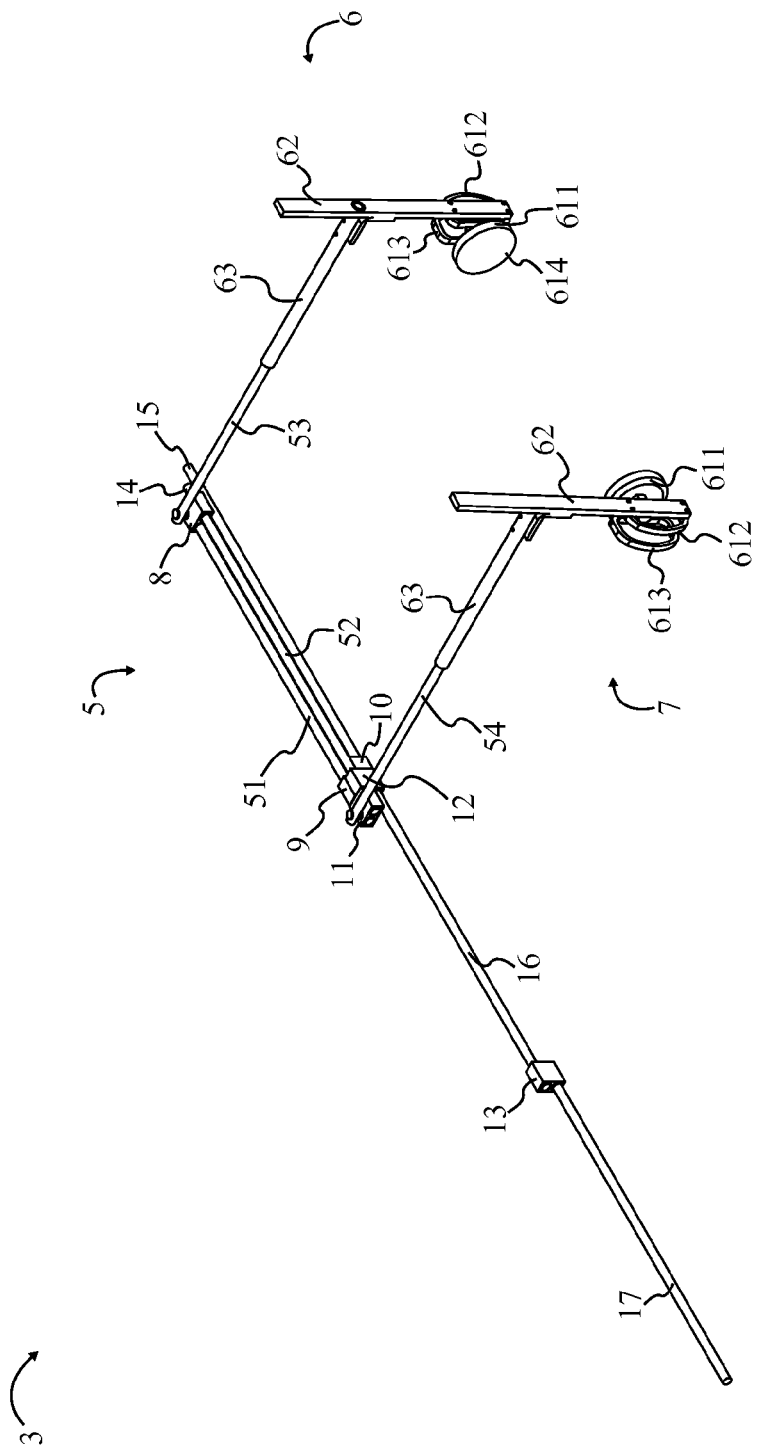
FIG. 2 is a perspective view of the partially compacted left structure of the present invention.
Figure 3:
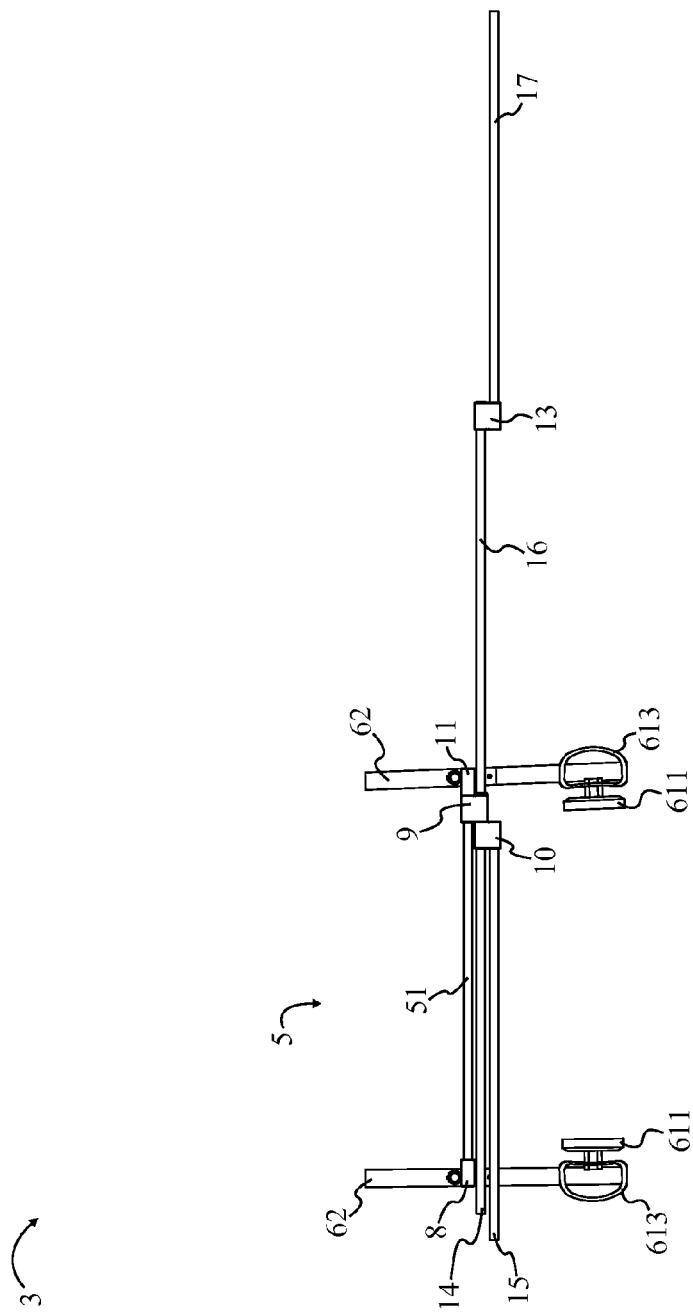
FIG. 3 is a side view of the partially compacted left structure of the present invention.
Figure 4:
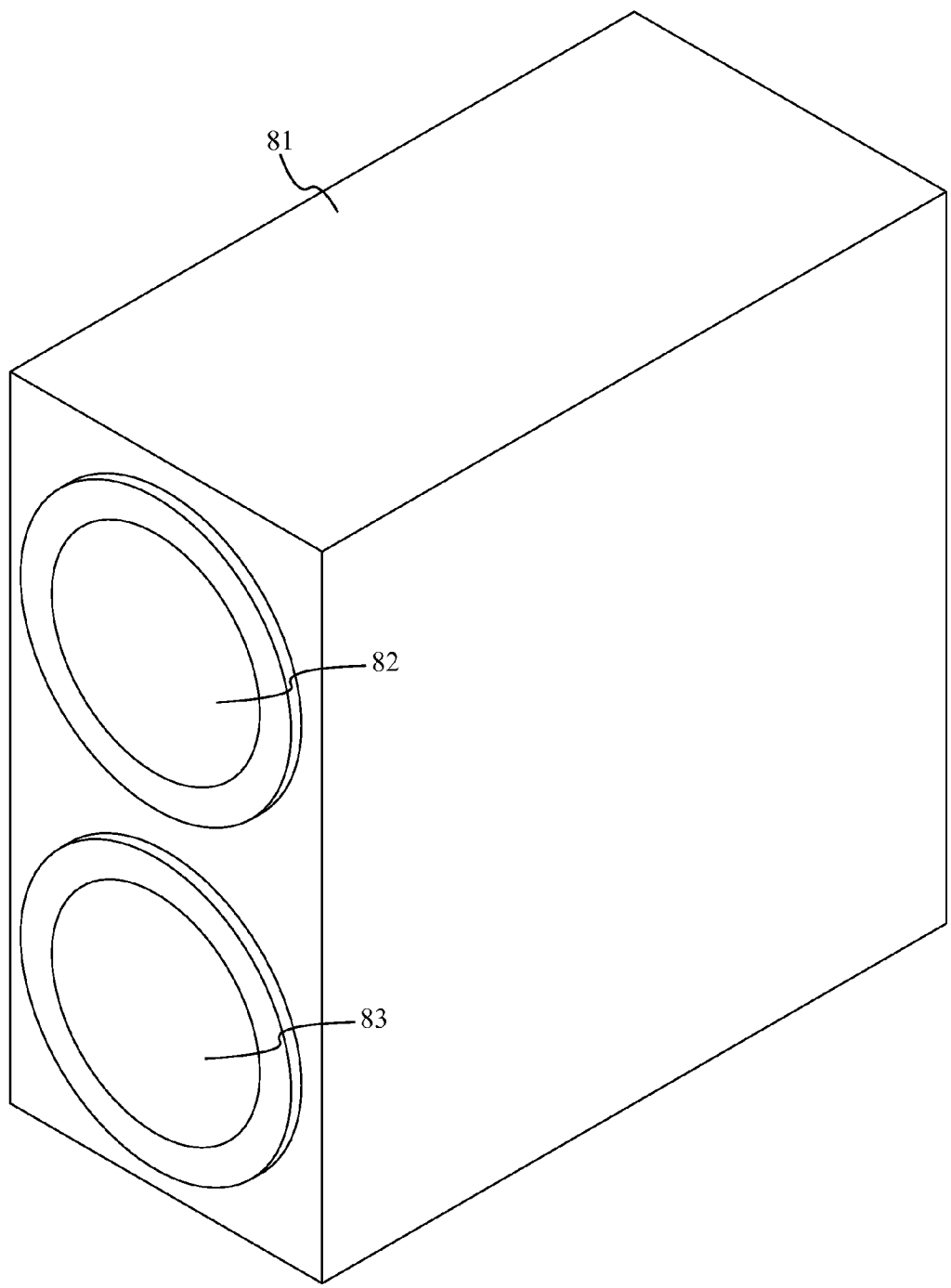
FIG. 4 is a perspective view of a connector of the present invention.
Figure 5:
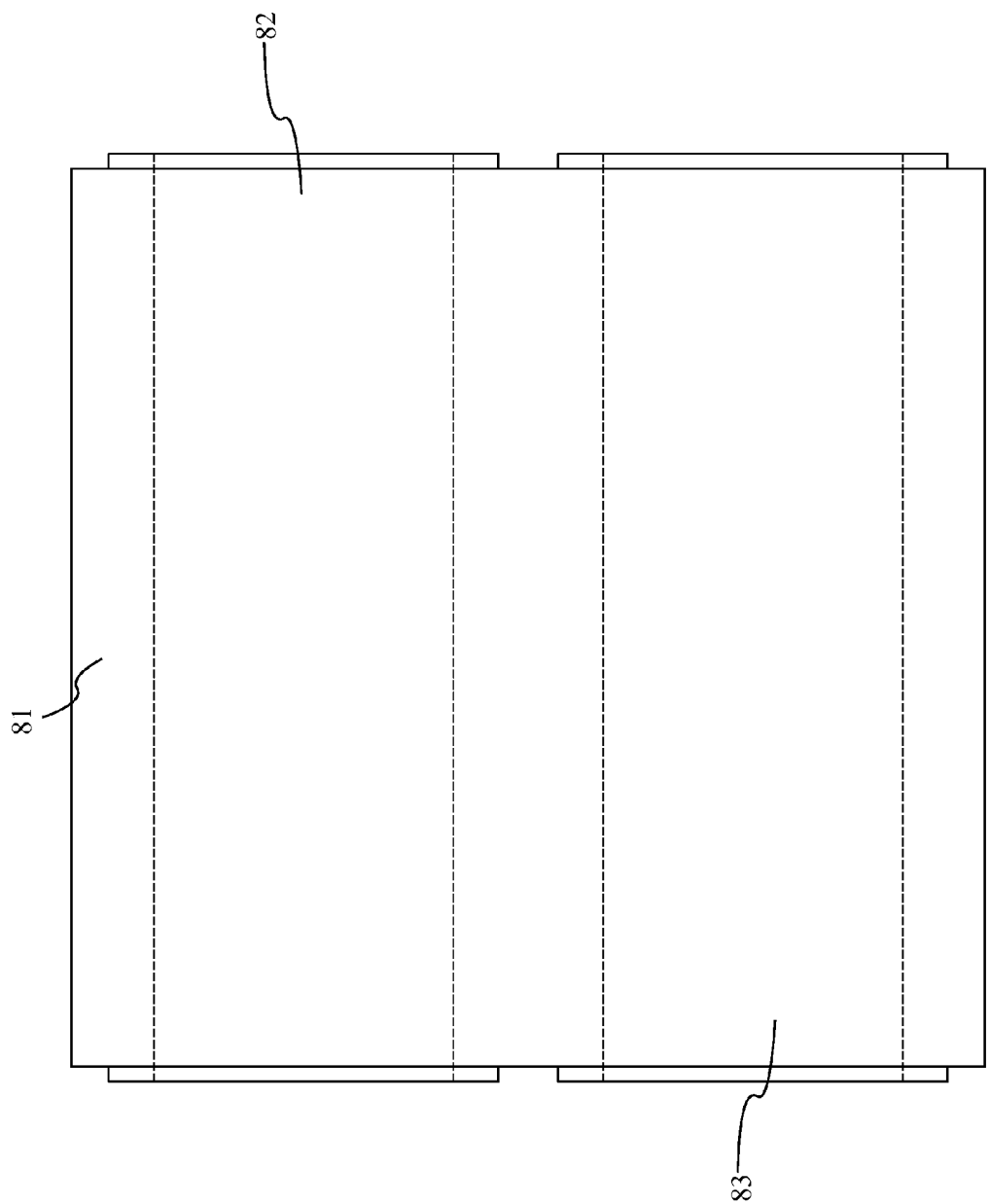
FIG. 5 is a side view of a connector of the present invention.

The center section 5 comprises an outer flex rod 51, an inner flex rod 52, a front spacing rod 53, and a rear spacing rod 54, as shown in FIG. 1-FIG. 3. These are linked to the extension rods by the connectors, specifically the front connector 8, first front sliding connector 9, second front sliding connector 10, rear connector 11, first rear sliding connector 12, and second rear sliding connector 13. Each of the connectors comprises a connector body 81, a first bore 82, and a second bore 83, as illustrated in FIG. 4 and FIG. 5. The first bore 82 and the second bore 83 are cut through the connector body 81, and the bores are positioned adjacent to each other, with their center axes being parallel. The first bore 82 and the second bore 83 receive either the flex rods or the extension rods, and are designed to allow the extension and retraction of the extension rods. While the front connector 8 and the rear connector 11 are designed to hold the outer flex rod 51 and inner flex rod 52 in place, and therefore are stationary, the bores of the other connectors allow a sliding connector to move an extension rod along outer flex rod 51 or the inner flex rod 52.

As mentioned previously, the outer flex rod 51 and the inner flex rod 52 are held in place by the front connector 8 and the rear connector 11. The front connector 8 and the rear connector 11 are aligned with each other, positioned at opposite ends of the outer flex rod 51 and the inner flex rod 52. The outer flex rod 51 connects to the first bore 82 of both the front connector 8 and the rear connector 11. Similarly, the inner flex rod 52 connects to the second bore 83 of both the front connector 8 and the rear connector 11. Connected to the front connector 8 and the rear connector 11 is a front spacing rod 53 and a rear spacing rod 54, respectively. These spacing rods serve to connect the center section 5 to the front mounting section 6 and the rear mounting section 7. Preferably, the front spacing rod 53 and the rear spacing rod 54 are perpendicular to the outer flex rod 51 and inner flex rod 52. Potentially, the front spacing rod 53 and the rear spacing rod 54 could be rotatably connected to the front connector 8 and the rear connector 11, allowing for adjustments in the angle between the stationary flex rods and the mounting sections.

The first front extension flex rod 14 and the second front extension flex rod 15 interact with the center section 5 through the first front sliding connector 9 and the second front sliding connector 10. The first front sliding connector 9 is slidably engaged with the outer flex rod 51 by the first bore 82. The first bore 82 of the first front sliding connector 9 receives the outer flex rod 51, which enables the first front sliding connector 9 to be moved along the outer flex rod 51. The movement of the first front sliding connector 9 is constrained by the front connector 8 and the rear connector 11. Connected to the second bore 83 of the first front sliding connector 9 is the first front extension flex rod 14. The first front extension flex rod 14 is fixed in relation to the first front sliding connector 9. In addition to being connected to the first front sliding connector 9, the first front extension flex rod 14 serves as a mounting point for the second front sliding connector 10. The first bore 82 of the second front sliding connector 10 receives the first front extension flex rod 14, allowing the second front sliding connector 10 to move along the first front extension flex rod 14. The second front sliding connector 10 has range of motion that is limited by the length of the first front extension flex rod 14, with the first front sliding connector 9 acting as a barrier on one end. Connected to the second bore 83 of the second front sliding connector 10, on a side opposite the first front sliding connector 9, is the second front extension flex rod 15. The combination of the above components allow the present invention to extend in the frontal direction; a fully retracted position is achieved when the first front sliding connector 9 and the second front sliding connector 10 are moved to be immediately adjacent to the rear connector 11. To extend the extension rods in the frontal direction, the first front sliding connector 9 is moved to be immediately adjacent to the front connector 8, while the second front sliding connector 10 is moved to the end of the first front extension flex rod 14 opposite the first front sliding connector 9.

The inner flex rod 52, first rear extension flex rod 16, second rear extension flex rod 17, first rear sliding connector 12, and second rear sliding connector 13 allow extension in the rearwards direction, mirroring their counterparts that allow frontal extension. The inner flex rod 52 engages with the first rear sliding connector 12, such that the first bore 82 of the first rear sliding connector 12 receives the inner flex rod 52. This allows the first rear sliding connector 12 to move along the inner flex rod 52, with motion being limited by the front connector 8 or the rear connector 11 on either end. Immovably connected to the second bore 83 of the first rear sliding connector 12 is the first rear extension flex rod 16, positioned on the side opposite the front connector 8. The first rear extension flex rod 16 engages with the second rear sliding connector 13, with the first bore 82 of the second rear sliding connector 13 receiving the first rear extension flex rod 16. Similar to the first rear sliding connector's 12 relation to the inner flex rod 52, this relation means the second rear sliding connector 13 is capable of moving along the first rear extension flex rod 16. Connected to the second bore 83 of the second rear sliding connector 13, on the side opposite the front connector 8, is the second rear extension flex rod 17. To extend the first rear extension flex rod 16 and the second rear extension flex rod 17 in the rearward direction, the first rear sliding connector 12 is moved to be immediately adjacent to the rear connector 11 and the second rear sliding connector 13 is moved to the end of the first rear extension flex rod 17 opposite the first rear sliding connector 12. The components of the center section 5, the extension rods, and the connectors are depicted in FIG. 1-FIG. 3.

Figure 6:
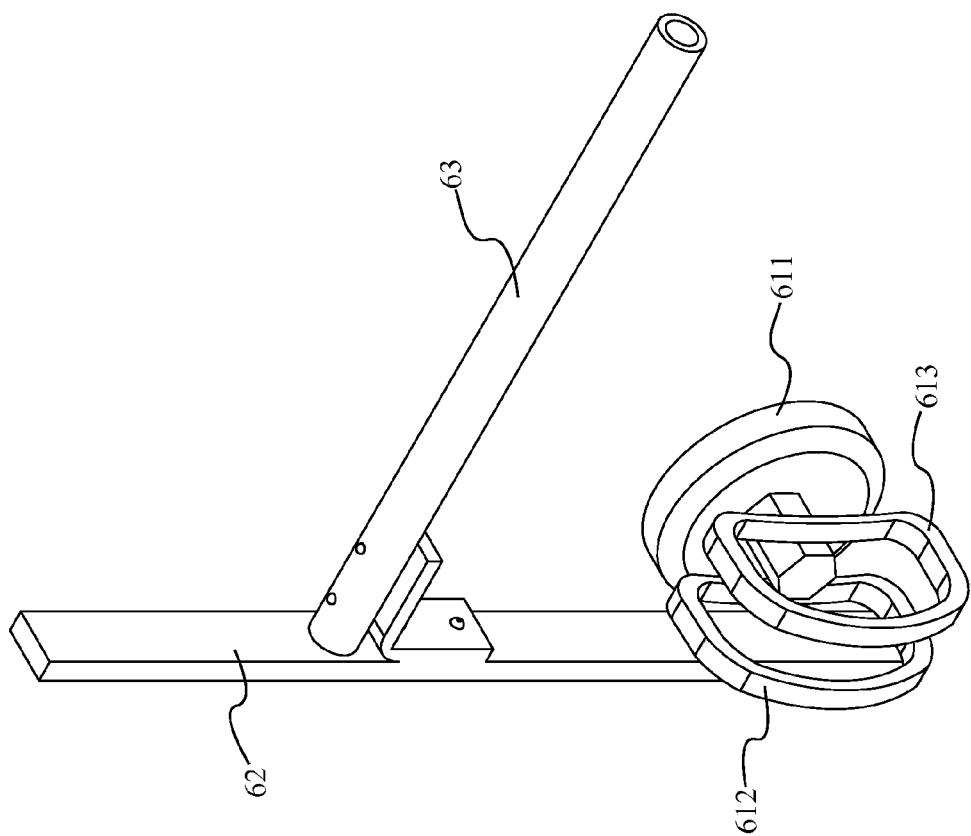
FIG. 6 is front perspective view of the mounting section of the present invention.
Figure 7:
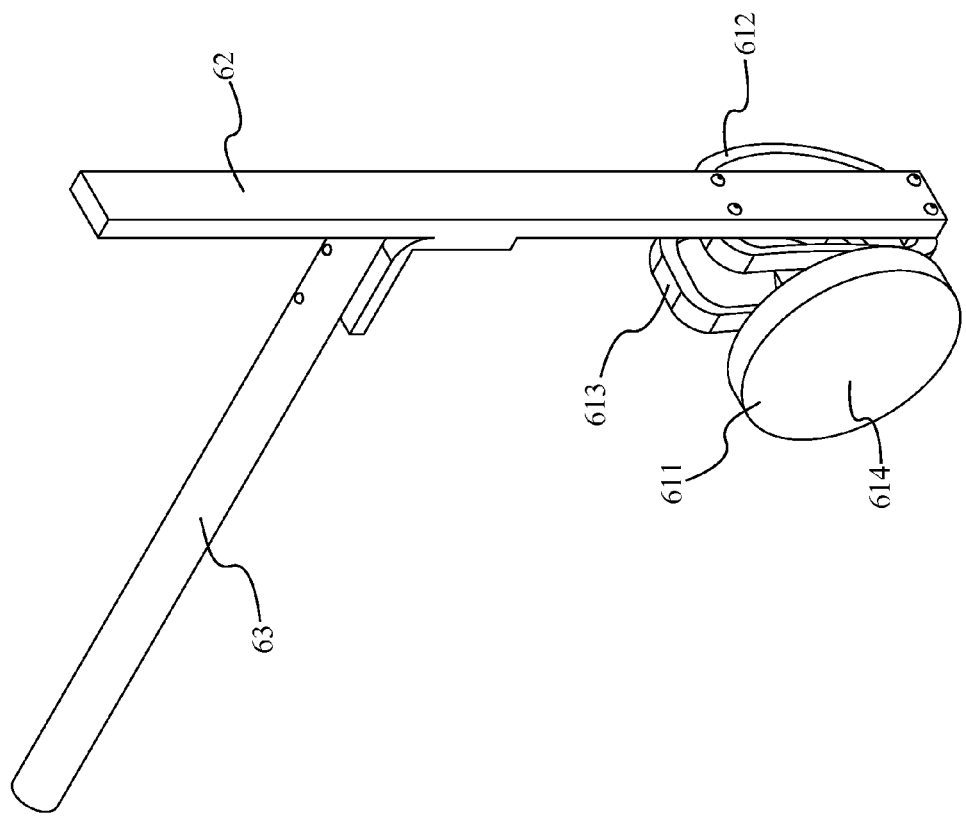
FIG. 7 is a rear perspective view of the mounting section of the present invention.

In order to attach the center section 5 and related components to a vehicle, a front mounting section 6 and a rear mounting section 7 is provided. The front mounting section 6 and the rear mounting section 7 each comprise a suction cup 61, an extension arm 62, and a connection arm 63, as shown in FIG. 6 and FIG. 7. The connection arm 63 connects to either the front spacing rod 53 or the rear spacing rod 54; the connection allows the connection arm 63 to spin about the axis of the front spacing rod 53 or rear spacing rod 54. Positioned at the opposite end of the connection arm 63, with respect to the front spacing rod 53 or rear spacing rod 54, is the suction cup 61. The suction cup 61 comprises a suction cup body 611, a first handle 612, a second handle 613, and a flexible concave surface 614. The suction cup 61 is connected to the extension arm 62 by the first handle 612. The second handle 613, which mirrors the first handle 612 across the suction cup body 611, can be squeezed against the first handle 612 to activate the suction cup 61, causing the suction cup 61 to adhere to a vehicle's window. On the bottom surface of the suction cup body 611, opposite the first handle 612 and the second handle 613, is the flexible concave surface 614. This flexible concave surface 614 allows the suction cup 61 to be affixed to surfaces by creating a pressure differential between the areas interior to and exterior to the flexible concave surface 614.

Figure 8:
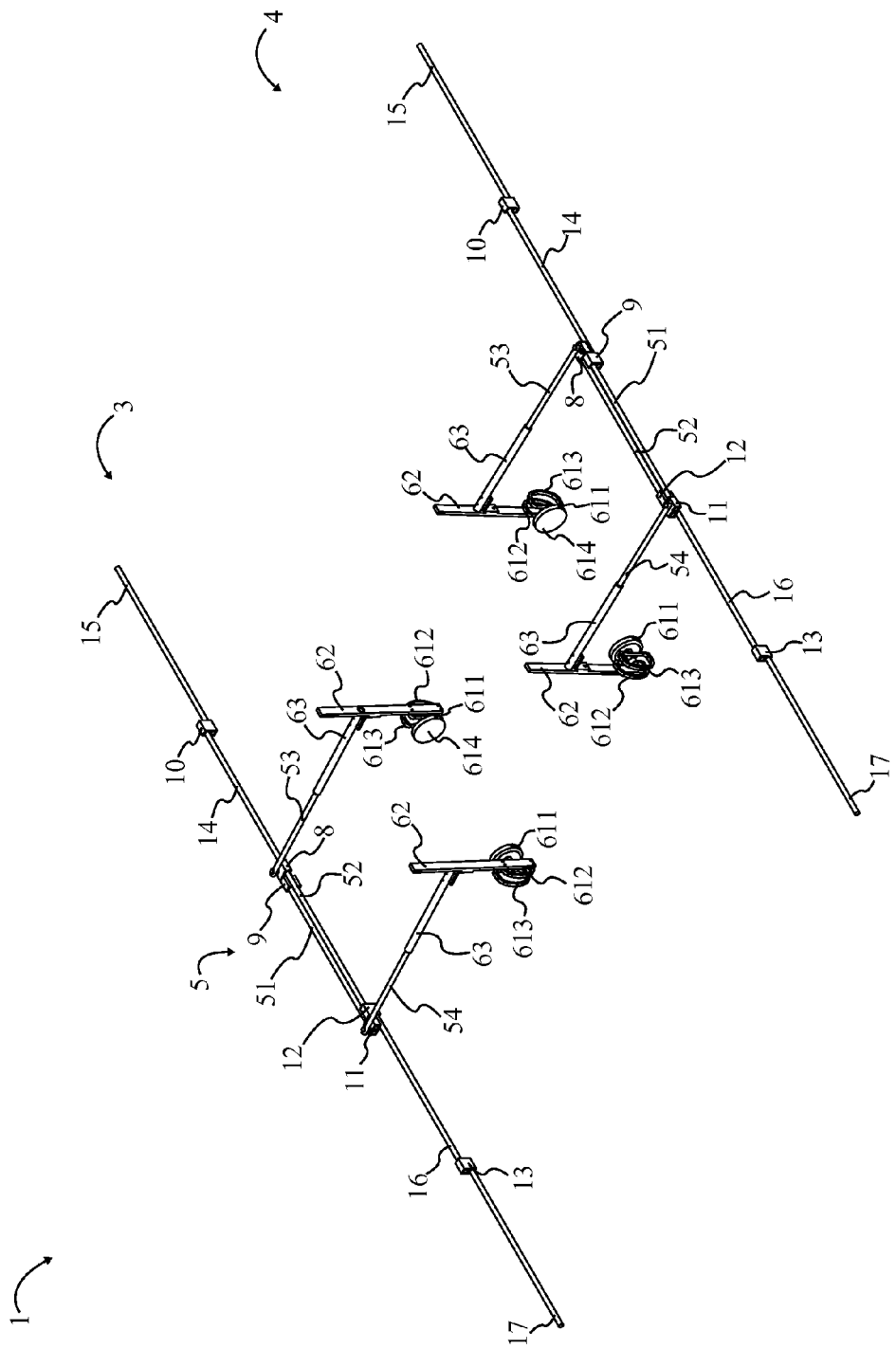
FIG. 8 is perspective view of the fully extended right and left structures of the present invention.
Figure 9:
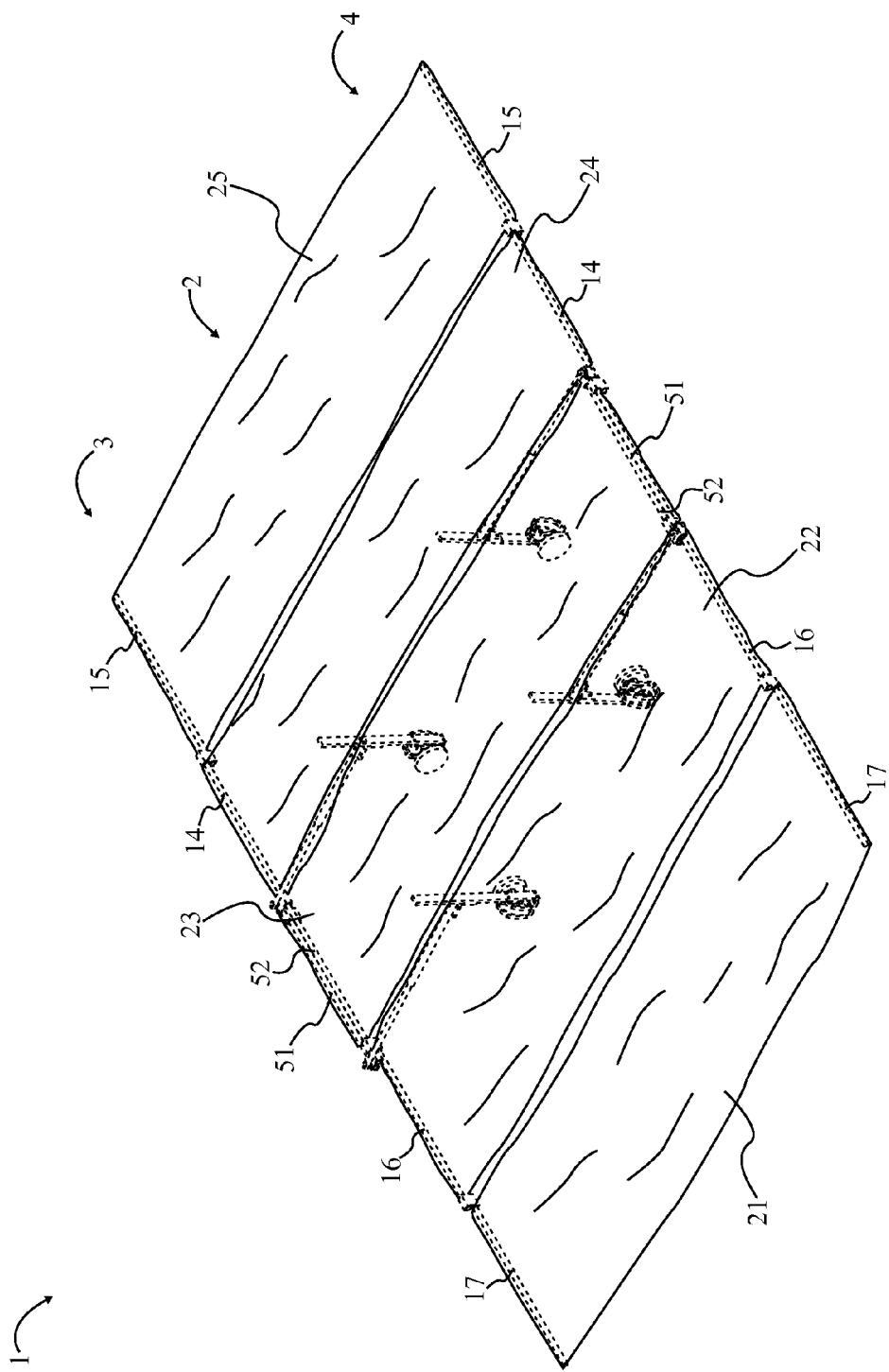
FIG. 9 is a perspective view of the fully extended present invention, including covering.

The left structure 3 and right structure 4, seen together in FIG. 8, are connected to each other by the plurality of covers 2, as illustrated in FIG. 9, which hang over the vehicle without coming into contact with the vehicle. The plurality of covers 2 comprises a first flexible sheet 21, a second flexible sheet 22, a third flexible sheet 23, a fourth flexible sheet 24, and a fifth flexible sheet 25. The first flexible sheet 21 connects the second front extension flex rod 15 of the left structure 3 to the second front extension flex rod 15 of the right structure 4, providing a first covered section. The second flexible sheet 22 connects the first front extension flex rod 14 of the left structure 3 to the first front extension flex rod 14 of the right structure 4, creating a second covered section. Connecting the inner flex rod 52 of the left structure 3 to the inner flex rod 52 of the right structure 4 is the third flexible sheet 23, forming a central covered section. The fourth flexible sheet 24 and the fifth flexible sheet 25 mirror the first flexible sheet 21 and the second flexible sheet 22; the fourth flexible sheet 24 connects the first rear extension flex rod 16 of the left structure 3 to the first rear extension flex rod 16 of the right structure 4, while the fifth flexible sheet 25 connects the second rear extension flex rod 17 of the left structure 3 to the second rear extension flex rod 17 of the right structure 4. These flexible sheets provide the covering function of the present invention; the other components are designed to support, adjust, and mount these flexible sheets to the vehicle. The flexible sheets are attached to individual pairs of flex rods to allow for the retraction of the extension flex rods; since each flexible sheet is attached to a single pair of extension rods, the extension rods can be extended or retracted and the flexible sheet will bunch or expand as necessary.

The design of the present invention allows it to be easily switched between a storage configuration and a deployed configuration. In the storage configuration the components of the present invention are arranged to minimize the amount of space required, while in the deployed configuration the components are arranged to attach to and provide cover for a vehicle.

In a storage configuration the first front extension flex rod 14, second front extension flex rod 15, first rear extension flex rod 16, and second rear extension flex rod 17 are retracted to be adjacent to the center section 5. This is accomplished by moving the first front sliding connector 9 and second front sliding connector 10 to be next to the rear connector 11, while also moving the first rear sliding connector 12 and second rear sliding connector 13 to be next to the front connector 8. In this arrangement, the total length of the present invention will only be slightly longer than the center section 5. The present invention can then be rolled (thanks to the foldable nature of the flexible sheets) together, bringing the left structure 3 and right structure 4 next to each other. In other embodiments, where the front spacing rod 53 and rear spacing rod 54 are rotatably connected to the front connector 8 and the rear connector 11, the present invention can be further compacted by folding the front spacing rod 53 and rear spacing rod 54 to be parallel with the center section 5.

To be deployed from a storage configuration, the flexible sheets are unrolled to a flat position, separating the left structure 3 and right structure 4 from each other. Once unrolled, the present invention is mounted to a vehicle by placing the suction cup 61 of the front mounting section 6 on the front windshield and placing the suction cup 61 of the rear mounting section 7 on the rear window. This is done for both the left structure 3 and the right structure 4. Potentially, the suction cups 61 could be attached to the frame of the car, including painted areas, rather than the windows. Once the present invention is mounted, the third flexible sheet 23 is in position above the center of the vehicle, providing cover for the roof area. Once the suction cups 61 have been attached to the windshield and rear window, the extension rods can be extended. By moving the first front sliding connector 9 and the second front sliding connector 10 in the forward direction, the first flexible sheet 21 and the second flexible sheet 22 are positioned to cover the front section of the vehicle. Similarly, moving the first rear sliding connector 12 and the second rear sliding connector 13 in the rear direction moves the fourth flexible sheet 24 and the fifth flexible sheet 25 position to cover the rear section of the vehicle.

In the preferred embodiment, the flex rods are made from fiberglass, providing for a light weight yet sturdy frame. The flexible nature of the flex rods is advantageous in winter conditions. Providing a flexible sheet which is water repellant, the compactable cover can be left up in snow and icy conditions. While the weight of snow will press down on the flexible sheets and as a result the frame, the flex rods can simply bend to accommodate the additional weight of the snow. After a snowfall (or rainfall) the snow or water can simply be brushed off the water repellant flexible sheets, after which the cover can be removed as normal. The suction cups 61, which need to be capable of supporting the frame and attaching to the vehicle, are already in use in the tiling and window industries and do not need to be designed separately. The design, configuration, and light weight properties of the present invention enable a person to easily deploy it; it is possible to convert the present invention from a storage configuration to a deployed configuration in less than a minute, including mounting the present invention to a vehicle.

Due to the differing size of vehicles, the exact dimensions of the present invention will vary with the class and even model of vehicle. For example, a truck will require longer flex rods than would a compact sedan. In other embodiments, additional components could be provided for the present invention. For example, flexible sheets which drape off the side of the vehicle could be attached to the flex rods, further protecting the vehicle. Rigid panels could be provided as well, replacing the flexible sheets as the cost of ease of use and compact storage. While additional changes and modifications can be made to the present invention, care must be taken that said changes do not interfere with the mounting system, flexible sheets, and extension flex rods.

Although the invention has been explained in relation to its preferred embodiment, it is to be understood that many other possible modifications and variations can be made without departing from the spirit and scope of the invention as hereinafter claimed.

What is claimed is:

1. A compactable vehicle cover comprises,
a frame structure;
a plurality of covers;
the frame structure comprises a left structure and a right structure;
the left structure and the right structure each comprise a center section, a front mounting section, a rear mounting section, front connector, a first front sliding connector, a second front sliding connector, a rear connector, a first rear sliding connector, and a second rear sliding connector, a first front extension flex rod, a second front extension flex rod, a first rear extension flex rod, and a second rear extension flex rods;
the center section comprises a outer flex rod, a inner flex rod, a front spacing rod, and a rear spacing rod;
the front mounting section and the rear mounting section each comprise a suction cup, an extension arm, and a connection arm;
the outer flex rod and the inner flex rod being parallel and adjacent to each other;
the front section being positioned adjacent to the outer flex rod;
the rear section being positioned adjacent to the inner flex rod;
the first front extension flex rod being telescopically engaged to the outer flex rod;
the second front extension flex rod being telescopically engaged to the first front extension flex rod;
the first rear extension flex rod being telescopically engaged to the inner flex rod;
the second rear extension flex rod being telescopically engaged to the first rear extension flex rod;
the left structure and the right structure being connected to each other by the plurality of covers; and
the plurality of covers being positioned on and across the left structure and the right structure.

2. The compactable vehicle cover as claimed in claim 1 comprises,
the front connector being connected to the outer flex rod and the inner flex rod;
the rear connector being connected to the outer flex rod and the inner flex rod opposite the front connector;
the first front sliding connector being slidably engaged with the outer flex rod;
the first front extension flex rod being connected to the first front sliding connector;
the second front sliding connector being slidably engaged with the first front extension flex rod;
the second front extension flex rod being connected to the second front sliding connector;
the first rear sliding connector being slidably engaged with the inner flex rod;

the first rear extension flex rod being connected to the first rear sliding connector;

the second rear sliding connector being slidably engaged with the first rear extension flex rod; and the second rear extension flex rod being connected to the second rear sliding connector.

3. The compactable vehicle cover as claimed in claim 2 comprises, the front connector, the first front sliding connector, the second front sliding connector, the rear connector, the first rear sliding connector, and the second rear sliding connector each comprise a connector body, a first bore and a second bore;

the first bore being traversing through the front connector, the first front sliding connector, the second front sliding connector, the rear connector, the first rear sliding connector, and the second rear sliding connector;

the second bore being traversing through the front connector, the first front sliding connector, the second front sliding connector, the rear connector, the first rear sliding connector, and the second rear sliding connector;

the first bore and the second bore being positioned adjacent to each other; and the first bore and the second bore being parallel to each other.

4. The compactable vehicle cover as claimed in claim 2 comprises, the outer flex rod being engaged with the first bore of the front connector and the first bore of the rear connector;

the outer flex rod traversing through the first bore of the first front sliding connector;

the first bore of the first front sliding connector being engaged with the outer flex rod in between the front connector and the rear connector;

the first front extension flex rod being connected to the second bore of the first front sliding connector;

the first front extension flex rod traversing through the first bore of the second front sliding connector;

the first bore of the second front sliding connector being engaged with the first front extension flex rod adjacent to the first front sliding connector and opposite the rear connector;

the second front extension flex rod being connected to the second bore of the second front sliding connector;

the inner flex rod being engaged with the second bore of the front connector and the second bore of the rear connector;

the inner flex rod traversing through the first bore of the first rear sliding connector;

the first bore of the first rear sliding connector being engaged with the inner flex rod in between the front connector and the rear connector;

the first rear extension flex rod being connected to the second bore of the first rear sliding connector;

the first rear extension flex rod traversing through the first bore of the second rear sliding connector;

the first bore of the second rear sliding connector being engaged with the first rear extension flex rod adjacent to the first rear sliding connector and opposite the front connector; and the second rear extension flex rod being connected to the second bore of the second rear sliding connector.

5. The compactable vehicle cover as claimed in claim 1 comprises, the front spacing rod being perpendicular to the outer flex rod;

the front spacing rod being connected to the front connector;

the rear spacing rod being perpendicular to the inner flex rod;

the rear spacing rod being connected to the rear connector;

the front spacing rod being telescopically connected to the connection arm of the front section;

the front spacing rod being rotatably connected to the connection arm of the front section;

the rear spacing rod being telescopically connected to the connection arm of the rear section;

the rear spacing rod being rotatably connected to the connection arm of the rear section;

the extension arm of the front section being perpendicularly connected to the connection arm of the front section opposite the front spacing rod;

the extension arm of the rear section being connected to the connection arm of the rear section opposite the rear spacing rod; and the suction cup being connected to the extension arm opposite the connection arm.

6. The compactable vehicle cover as claimed in claim 5 comprises, the suction cup comprises a suction cup body, a first handle, a second handle, and a flexible concave surface, wherein the flexible concave surface of the front section engages with a front windshield of a car and the flexible concave surface of the rear section engages with a rear window of the car;

the first handle and the second handle being positioned adjacent to each other, wherein squeezing the first handle and the second handle together engages the flexible concave surface;

the flexible concave surface being positioned adjacent to the suction cup body;

the first handle and the second handle being positioned adjacent to the suction cup body and opposite the flexible concave surface; and the first handle being connected to the extension arm.

7. The compactable vehicle cover as claimed in claim 1 comprises, the second front extension flex rod of the left structure being parallel with the second front extension flex rod of the right structure;

the first front extension flex rod of the left structure being parallel with the first front extension flex rod of the right structure;

the outer flex rod of the left structure being parallel with the outer flex rod of the right structure;

the inner flex rod of the left structure being parallel with the inner flex rod of the right structure;

the first rear extension flex rod of the left structure being parallel with the first rear extension flex rod of the right structure; and the second rear extension flex rod of the left structure being parallel with the second rear extension flex rod of the right structure.

8. The compactable vehicle cover as claimed in claim 1 comprises, the plurality of covers comprises a first flexible sheet, a second flexible sheet, a third flexible sheet, a fourth flexible sheet, and a fifth flexible sheet;

the second front extension flex rod of the left structure being connected to the second front extension flex rod of the right structure by the first flexible sheet;

the first front extension flex rod of the left structure being connected to the first front extension flex rod of the right structure by the second flexible sheet;

the inner flex rod of the left structure being connected to the inner flex rod of the right structure by the third flexible sheet;

the first rear extension flex rod of the left structure being connected to the first rear extension flex rod of the right structure by the fourth flexible sheet; and the second rear extension flex rod of the left structure being connected to the second rear extension flex rod of the right structure by the fifth flexible sheet.

9. A compactable vehicle cover comprises, a frame structure;

a plurality of covers;

the frame structure comprises a left structure and a right structure;

the left structure and the right structure each comprise a center section, a front mounting section, a rear mounting section, front connector, a first front sliding connector, a second front sliding connector, a rear connector, a first rear sliding connector, and a second rear sliding connector, a first front extension flex rod, a second front extension flex rod, a first rear extension flex rod, and a second rear extension flex rods;

the center section comprises a outer flex rod, a inner flex rod, a front spacing rod, and a rear spacing rod;

the front mounting section and the rear mounting section each comprise a suction cup, an extension arm, and a connection arm;

the outer flex rod and the inner flex rod being parallel and adjacent to each other;

the front section being positioned adjacent to the outer flex rod;

the rear section being positioned adjacent to the inner flex rod;

the first front extension flex rod being telescopically engaged to the outer flex rod;

the second front extension flex rod being telescopically engaged to the first front extension flex rod;

the first rear extension flex rod being telescopically engaged to the inner flex rod;

the second rear extension flex rod being telescopically engaged to the first rear extension flex rod;

the left structure and the right structure being connected to each other by the plurality of covers;

the plurality of covers being positioned on and across the left structure and the right structure;

the front spacing rod being connected to the front connector;

the rear spacing rod being connected to the rear connector;

the front spacing rod being rotatably connected to the connection arm of the front section; and the rear spacing rod being rotatably connected to the connection arm of the rear section.

10. The compactable vehicle cover as claimed in claim 9 comprises, the front connector being connected to the outer flex rod and the inner flex rod;

the rear connector being connected to the outer flex rod and the inner flex rod opposite the front connector;

the first front sliding connector being slidably engaged with the outer flex rod;

the first front extension flex rod being connected to the first front sliding connector;

the second front sliding connector being slidably engaged with the first front extension flex rod;

the second front extension flex rod being connected to the second front sliding connector;

the first rear sliding connector being slidably engaged with the inner flex rod;

the first rear extension flex rod being connected to the first rear sliding connector;

the second rear sliding connector being slidably engaged with the first rear extension flex rod;

the second rear extension flex rod being connected to the second rear sliding connector;

the front connector, the first front sliding connector, the second front sliding connector, the rear connector, the first rear sliding connector, and the second rear sliding connector each comprise a connector body, a first bore and a second bore;

the first bore being traversing through the front connector, the first front sliding connector, the second front sliding connector, the rear connector, the first rear sliding connector, and the second rear sliding connector;

the second bore being traversing through the front connector, the first front sliding connector, the second front sliding connector, the rear connector, the first rear sliding connector, and the second rear sliding connector;

the first bore and the second bore being positioned adjacent to each other; and the first bore and the second bore being parallel to each other.

11. The compactable vehicle cover as claimed in claim 10 comprises, the outer flex rod being engaged with the first bore of the front connector and the first bore of the rear connector;

the outer flex rod traversing through the first bore of the first front sliding connector;

the first bore of the first front sliding connector being engaged with the outer flex rod in between the front connector and the rear connector;

the first front extension flex rod being connected to the second bore of the first front sliding connector;

the first front extension flex rod traversing through the first bore of the second front sliding connector;

the first bore of the second front sliding connector being engaged with the first front extension flex rod adjacent to the first front sliding connector and opposite the rear connector;

the second front extension flex rod being connected to the second bore of the second front sliding connector;

the inner flex rod being engaged with the second bore of the front connector and the second bore of the rear connector;

the inner flex rod traversing through the first bore of the first rear sliding connector;

the first bore of the first rear sliding connector being engaged with the inner flex rod in between the front connector and the rear connector;

the first rear extension flex rod being connected to the second bore of the first rear sliding connector;

the first rear extension flex rod traversing through the first bore of the second rear sliding connector;

the first bore of the second rear sliding connector being engaged with the first rear extension flex rod adjacent to the first rear sliding connector and opposite the front connector; and the second rear extension flex rod being connected to the second bore of the second rear sliding connector.

12. The compactable vehicle cover as claimed in claim 9 comprises, the front spacing rod being perpendicular to the outer flex rod;

the rear spacing rod being perpendicular to the inner flex rod;

the front spacing rod being telescopically connected to the connection arm of the front section;

the rear spacing rod being telescopically connected to the connection arm of the rear section;

the extension arm of the front section being perpendicularly connected to the connection arm of the front section opposite the front spacing rod;

the extension arm of the rear section being connected to the connection arm of the rear section opposite the rear spacing rod;

the suction cup being connected to the extension arm opposite the connection arm;

the suction cup comprises a suction cup body, a first handle, a second handle, and a flexible concave surface, wherein the flexible concave surface of the front section engages with a front windshield of a car and the flexible concave surface of the rear section engages with a rear window of the car;

the first handle and the second handle being positioned adjacent to each other, wherein squeezing the first handle and the second handle together engages the flexible concave surface;

the flexible concave surface being positioned adjacent to the suction cup body;

the first handle and the second handle being positioned adjacent to the suction cup body and opposite the flexible concave surface; and the first handle being connected to the extension arm.

13. The compactable vehicle cover as claimed in claim 9 comprises, the second front extension flex rod of the left structure being parallel with the second front extension flex rod of the right structure;

the first front extension flex rod of the left structure being parallel with the first front extension flex rod of the right structure;

the outer flex rod of the left structure being parallel with the outer flex rod of the right structure;

the inner flex rod of the left structure being parallel with the inner flex rod of the right structure;

the first rear extension flex rod of the left structure being parallel with the first rear extension flex rod of the right structure; and the second rear extension flex rod of the left structure being parallel with the second rear extension flex rod of the right structure.

14. The compactable vehicle cover as claimed in claim 9 comprises, the plurality of covers comprises a first flexible sheet, a second flexible sheet, a third flexible sheet, a fourth flexible sheet, and a fifth flexible sheet;

the second front extension flex rod of the left structure being connected to the second front extension flex rod of the right structure by the first flexible sheet;

the first front extension flex rod of the left structure being connected to the first front extension flex rod of the right structure by the second flexible sheet;

the inner flex rod of the left structure being connected to the inner flex rod of the right structure by the third flexible sheet;

the first rear extension flex rod of the left structure being connected to the first rear extension flex rod of the right structure by the fourth flexible sheet; and the second rear extension flex rod of the left structure being connected to the second rear extension flex rod of the right structure by the fifth flexible sheet.

15. A compactable vehicle cover comprises, a frame structure;

a plurality of covers;

the frame structure comprises a left structure and a right structure;

the left structure and the right structure each comprise a center section, a front mounting section, a rear mounting section, front connector, a first front sliding connector, a second front sliding connector, a rear connector, a first rear sliding connector, and a second rear sliding connector, a first front extension flex rod, a second front extension flex rod, a first rear extension flex rod, and a second rear extension flex rods;

the center section comprises a outer flex rod, a inner flex rod, a front spacing rod, and a rear spacing rod;

the front mounting section and the rear mounting section each comprise a suction cup, an extension arm, and a connection arm;

the outer flex rod and the inner flex rod being parallel and adjacent to each other;

the front section being positioned adjacent to the outer flex rod;

the rear section being positioned adjacent to the inner flex rod;

the first front extension flex rod being telescopically engaged to the outer flex rod;

the second front extension flex rod being telescopically engaged to the first front extension flex rod;

the first rear extension flex rod being telescopically engaged to the inner flex rod;

the second rear extension flex rod being telescopically engaged to the first rear extension flex rod;

the left structure and the right structure being connected to each other by the plurality of covers;

the plurality of covers being positioned on and across the left structure and the right structure;

the front spacing rod being connected to the front connector;

the rear spacing rod being connected to the rear connector;

the front spacing rod being rotatably connected to the connection arm of the front section;

the rear spacing rod being rotatably connected to the connection arm of the rear section;

the front connector being connected to the outer flex rod and the inner flex rod;

the rear connector being connected to the outer flex rod and the inner flex rod opposite the front connector;

the first front sliding connector being slidably engaged with the outer flex rod;

the first front extension flex rod being connected to the first front sliding connector;

the second front sliding connector being slidably engaged with the first front extension flex rod;

the second front extension flex rod being connected to the second front sliding connector;

the first rear sliding connector being slidably engaged with the inner flex rod;

the first rear extension flex rod being connected to the first rear sliding connector;

the second rear sliding connector being slidably engaged with the first rear extension flex rod;

the second rear extension flex rod being connected to the second rear sliding connector;

the front connector, the first front sliding connector, the second front sliding connector, the rear connector, the first rear sliding connector, and the second rear sliding connector each comprise a connector body, a first bore and a second bore;

the suction cup comprises a suction cup body, a first handle, a second handle, and a flexible concave surface, wherein the flexible concave surface of the front section engages with a front windshield of a car and the flexible concave surface of the rear section engages with a rear window of the car; and the plurality of covers comprises a first flexible sheet, a second flexible sheet, a third flexible sheet, a fourth flexible sheet, and a fifth flexible sheet.

16. The compactable vehicle cover as claimed in claim 15 comprises, the first bore being traversing through the front connector, the first front sliding connector, the second front sliding connector, the rear connector, the first rear sliding connector, and the second rear sliding connector;

the second bore being traversing through the front connector, the first front sliding connector, the second front sliding connector, the rear connector, the first rear sliding connector, and the second rear sliding connector;

the first bore and the second bore being positioned adjacent to each other; and the first bore and the second bore being parallel to each other.

17. The compactable vehicle cover as claimed in claim 15 comprises, the outer flex rod being engaged with the first bore of the front connector and the first bore of the rear connector;

the outer flex rod traversing through the first bore of the first front sliding connector;

the first bore of the first front sliding connector being engaged with the outer flex rod in between the front connector and the rear connector;

the first front extension flex rod being connected to the second bore of the first front sliding connector;

the first front extension flex rod traversing through the first bore of the second front sliding connector;

the first bore of the second front sliding connector being engaged with the first front extension flex rod adjacent to the first front sliding connector and opposite the rear connector;

the second front extension flex rod being connected to the second bore of the second front sliding connector;

the inner flex rod being engaged with the second bore of the front connector and the second bore of the rear connector;

the inner flex rod traversing through the first bore of the first rear sliding connector;

the first bore of the first rear sliding connector being engaged with the inner flex rod in between the front connector and the rear connector;

the first rear extension flex rod being connected to the second bore of the first rear sliding connector;

the first rear extension flex rod traversing through the first bore of the second rear sliding connector;

the first bore of the second rear sliding connector being engaged with the first rear extension flex rod adjacent to the first rear sliding connector and opposite the front connector; and the second rear extension flex rod being connected to the second bore of the second rear sliding connector.

18. The compactable vehicle cover as claimed in claim 15 comprises, the front spacing rod being perpendicular to the outer flex rod;

the rear spacing rod being perpendicular to the inner flex rod;

the front spacing rod being telescopically connected to the connection arm of the front section;

the rear spacing rod being telescopically connected to the connection arm of the rear section;

the extension arm of the front section being perpendicularly connected to the connection arm of the front section opposite the front spacing rod;

the extension arm of the rear section being connected to the connection arm of the rear section opposite the rear spacing rod;

the suction cup being connected to the extension arm opposite the connection arm;

the first handle and the second handle being positioned adjacent to each other, wherein squeezing the first handle and the second handle together engages the flexible concave surface;

the flexible concave surface being positioned adjacent to the suction cup body;

the first handle and the second handle being positioned adjacent to the suction cup body and opposite the flexible concave surface; and the first handle being connected to the extension arm.

19. The compactable vehicle cover as claimed in claim 15 comprises, the second front extension flex rod of the left structure being parallel with the second front extension flex rod of the right structure;

the first front extension flex rod of the left structure being parallel with the first front extension flex rod of the right structure;

the outer flex rod of the left structure being parallel with the outer flex rod of the right structure;

the inner flex rod of the left structure being parallel with the inner flex rod of the right structure;

the first rear extension flex rod of the left structure being parallel with the first rear extension flex rod of the right structure; and the second rear extension flex rod of the left structure being parallel with the second rear extension flex rod of the right structure.

20. The compactable vehicle cover as claimed in claim 15 comprises, the second front extension flex rod of the left structure being connected to the second front extension flex rod of the right structure by the first flexible sheet;

the first front extension flex rod of the left structure being connected to the first front extension flex rod of the right structure by the second flexible sheet;

the inner flex rod of the left structure being connected to the inner flex rod of the right structure by the third flexible sheet;

the first rear extension flex rod of the left structure being connected to the first rear extension flex rod of the right structure by the fourth flexible sheet; and the second rear extension flex rod of the left structure being connected to the second rear extension flex rod of the right structure by the fifth flexible sheet.

* * * * *